(12) United States Patent
Ono

(10) Patent No.: US 8,831,850 B2
(45) Date of Patent: Sep. 9, 2014

(54) BRAKE HYDRAULIC CONTROL METHOD AND SYSTEM

(75) Inventor: Shunsaku Ono, Kanagawa (JP)

(73) Assignee: Bosch Corporation, Tokyo (JP)

( * ) Notice: Subject to any disclaimer, the term of this patent is extended or adjusted under 35 U.S.C. 154(b) by 177 days.

(21) Appl. No.: 13/638,354

(22) PCT Filed: Mar. 31, 2010

(86) PCT No.: PCT/JP2010/055904
§ 371 (c)(1),
(2), (4) Date: Sep. 28, 2012

(87) PCT Pub. No.: WO2011/121772
PCT Pub. Date: Oct. 6, 2011

(65) Prior Publication Data
US 2013/0018561 A1    Jan. 17, 2013

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |
| *B60T 8/1763* | (2006.01) | |
| *B60T 8/17* | (2006.01) | |

(52) U.S. Cl.
CPC ........... *B60T 8/1706* (2013.01); *B60T 8/17636* (2013.01)
USPC ................. 701/70; 701/82; 701/83; 303/155; 303/156; 303/157; 303/158

(58) Field of Classification Search
USPC .......... 701/70, 71, 82, 83; 303/121, 155, 156, 303/157, 158; 188/182
See application file for complete search history.

(56) References Cited

U.S. PATENT DOCUMENTS

| 6,089,681 | A  | * | 7/2000 | Watanabe | 303/158 |
| 7,597,409 | B2 | * | 10/2009 | Kokubo et al. | 303/152 |
| 8,070,237 | B2 | * | 12/2011 | Ogawa et al. | 303/9.64 |
| 2013/0197770 | A1 | * | 8/2013 | Osaki et al. | 701/70 |

FOREIGN PATENT DOCUMENTS

| JP | H05-069808 | 3/1993 |
| JP | 11020650 | 1/1999 |
| JP | 11-91523 | 4/1999 |
| JP | 2000-229563 | 8/2000 |

OTHER PUBLICATIONS

PCT/JP2010/055904 International Search Report dated Jun. 28, 2010, 1 page.
International Preliminary Report on Patentability for Application No. PCT/JP2010/055904 dated Sep. 30, 2012 (4 pages).

* cited by examiner

*Primary Examiner* — Rami Khatib
(74) *Attorney, Agent, or Firm* — Michael Best & Friedrich LLP

(57) ABSTRACT

A brake control method for a hydraulic brake device equipped with an actuator that automatically regulates braking liquid pressure in a wheel cylinder of a vehicle without driver intervention. The method includes: (a) calculating a time period in which holding or decreasing brake hydraulic pressure is continuously performed to the wheel cylinder; and (b) controlling the actuator such that, an increasing pressure and decreasing pressure to the wheel cylinder after the calculated time period has reached a predetermined time, the amount of the pressure increase and the amount of the pressure decrease are the same.

10 Claims, 4 Drawing Sheets

BRAKE HYDRAULIC CONTROL METHOD AND SYSTEM

TECHNICAL FIELD

The present invention relates to a method and system that control braking liquid pressure in a hydraulic brake device. More particularly, the present invention relates to a brake hydraulic control method that improves the braking feel of the driver during ABS operation and to a brake system for that purpose.

BACKGROUND OF THE INVENTION

Hydraulic brake devices equipped with an actuator that automatically regulates braking liquid pressure in wheel cylinders of a vehicle such as a two-wheeled motor vehicle or a passenger car without the intervention of an operation by the driver are known. For example, anti-lock braking systems (ABS) are coming to be used for brake control in two-wheeled motor vehicles. An ABS generally includes wheel speed sensors, an electronic control unit (ECU), and a hydraulic unit such as a hydraulic circuit. An ABS automatically controls hydraulic pressure in the wheel cylinders, without the intervention of an operation by the driver, when it detects a tendency for the wheels to lock. Further, in vehicles such as two-wheeled motor vehicles and passenger cars, electronic brake-force distribution (EBD) systems, which are systems that appropriately distribute the braking force applied to the front and rear wheels in accordance with driving conditions, are known.

The operation of a general ABS will be briefly described with reference to the hydraulic circuit shown in FIG. 1. FIG. 1 schematically shows a hydraulic circuit on the front wheel side of a two-wheeled motor vehicle. The front wheel hydraulic circuit of FIG. 1 is configured from a brake lever 101 that is operated by the driver, a master cylinder (M/C) 103 that is connected to the brake lever 101, a conduit 104 that is connected to the master cylinder 103, a charging valve (EV) 113 that is connected to the conduit 104 and is a normally open electromagnetic valve, a conduit 114 that is connected to the charging valve 113, and a wheel cylinder (W/C) 115 that is connected to the conduit 114 and operates the front wheel brake. Moreover, a pressure decreasing valve (AV) 123 that is a normally closed electromagnetic valve is connected to the conduit 114. Further, a conduit 124 is connected to the pressure decreasing valve 123, and a reservoir 125 is connected to the conduit 124. Moreover, a suction port of a hydraulic pump 119 is connected via a check valve to the conduit 124, and a discharge port of the hydraulic pump 119 is connected to the conduit 104 via a check valve. The hydraulic pump 119 is driven by a DC motor 118.

In the hydraulic circuit of FIG. 1, a hydraulic unit 100 operates when an unillustrated electronic control unit (ECU) detects a tendency for the front wheel to lock from the front wheel speed detected by an unillustrated front wheel speed sensor disposed in the front wheel at a time when the brake lever 101 is operated.

In this case, the ECU closes the charging valve 113 and opens the pressure decreasing valve 123 to allow the brake fluid in the wheel cylinder 115 to escape to the reservoir 125, whereby the ECU lowers the hydraulic pressure in the wheel cylinder 115 and eliminates the locking of the front wheel. When the locking tendency is sufficiently eliminated, the ECU closes the pressure decreasing valve 123 and opens the charging valve 113 to send the brake fluid to the wheel cylinder 115 and increase the pressure to the wheel cylinder 115.

Further, the ECU appropriately closes both the charging valve 113 and the pressure decreasing valve 123 to hold the wheel cylinder pressure at a constant. In this way, in the ABS operation, the ECU performs a pressure decreasing operation, a pressure increasing operation, and a holding operation several times.

SUMMARY OF THE INVENTION

Incidentally, during the operation of the ABS described above, sometimes the slip state of the wheel continues longer than the ordinarily assumed time, such as when the vehicle has abruptly changed from a road surface whose frictional resistance coefficient μ is large to a road surface whose frictional resistance coefficient μ is small or when the drag torque of the engine is large. At times when wheel slip continues for a long time during the operation of the ABS, sometimes the pressure decreasing mode and the holding mode of the wheel cylinder become longer than the ordinarily assumed time. At this time, because the charging valve is closed as described above, the brake fluid from the master cylinder does not flow to the wheel cylinder. Further, at this time, the brake fluid in the wheel cylinder and in the reservoir is returned to the master cylinder by the ABS. For that reason, sometimes the brake pedal or the brake lever is strongly pushed back and becomes stiff, creating a sense of rejection in the driver.

Further, sometimes the holding mode continues longer than ordinarily assumed when the wheel has oscillated or when the slip ratio of the wheel is at an ideal slip ratio. In this case, the charging valve is closed, so the brake fluid from the master cylinder does not flow to the wheel cylinder. For that reason, sometimes the brake pedal or the brake lever becomes stiff, creating a sense of rejection in the driver.

In order to prevent as much as possible a deterioration in the braking feel of the driver, the technology described in JP-A-2000-229563 changes the control cycle of the ABS on the basis of the friction coefficient of the road surface and the estimated vehicle body speed. However, according to this method, although the braking feel may be improved to some extent depending on conditions during driving, the method does not invariably ensure a constant braking feel. Further, for example, in the case of trying to improve the braking feel of a conventional ABS control system with the method described in JP-A-2000-229563, this has an impact on the performance of the ABS control because the control cycle of the ABS is altered, so an appropriate performance test becomes necessary. Problems that can arise during ABS control have been described as an example, but problems relating to the same deterioration in the braking feel can also arise in EBD control and the like.

Therefore, it is an object of the present invention to alleviate with a simple method the sense of rejection in a brake pedal or a brake lever that arises when a long pressure decreasing mode or a long holding mode has continued in a hydraulic brake device equipped with an actuator that automatically regulates braking liquid pressure in a wheel cylinder of a vehicle without the intervention of an operation by a driver like in an ABS function or an EBD function.

According to the present invention, there is provided a brake control method for a hydraulic brake device equipped with an actuator that automatically regulates braking liquid pressure in a wheel cylinder of a vehicle without the intervention of an operation by a driver. At a time when the actuator of the hydraulic brake device operates automatically the method includes: (a) a step of detecting whether pressure to the wheel cylinder is being increased; (b) a step of calculating a time period in which pressure to the wheel cylinder is not being increased; and (c) a step of increasing pressure and decreasing pressure to the wheel cylinder to an extent that has no impact on the braking force of the vehicle after the time period that has been calculated has reached a predetermined time.

According to an aspect of the method of the present invention, the increasing of pressure and the decreasing of pressure to the wheel cylinder in step (c) are performed with the decreasing of pressure coming before the increasing of pressure.

According to an aspect of the method of the present invention, the predetermined time is determined depending on at least one of a vehicle body traveling state, a wheel state, and a road surface state.

According to the present invention, there is provided a hydraulic brake device equipped with an actuator that automatically regulates braking liquid pressure in a wheel cylinder of a vehicle without the intervention of an operation by a driver. According to the brake system of the present invention, at a time when the actuator of the hydraulic brake device operates automatically the brake system includes: (a) means that detects whether pressure to the wheel cylinder is being increased; (b) means that calculates a time period in which pressure to the wheel cylinder is not being increased; and (c) means that increases pressure and decreases pressure to the wheel cylinder to an extent that has no impact on the braking force of the vehicle after the time period that has been calculated has reached a predetermined time.

According to an aspect of the brake system of the present invention, the increasing of pressure and the decreasing of pressure to the wheel cylinder in step (c) are performed with the decreasing of pressure coming before the increasing of pressure.

According to an aspect of the brake system of the present invention, the predetermined time is determined depending on at least one of a vehicle body traveling state, a wheel state, and a road surface state.

According to the present invention, there is provided a vehicle equipped with the brake system according to the present invention.

DETAILED DESCRIPTION

An embodiment of a brake hydraulic control method and a brake hydraulic control system of the present invention will be described with reference to the drawings.

Figure 2:
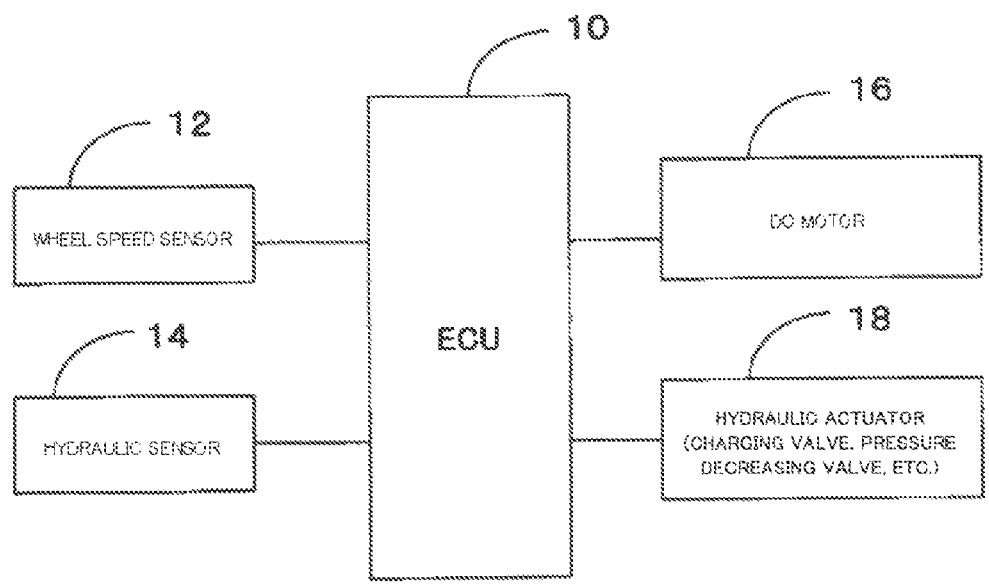
FIG. 2 is a block diagram showing the configuration of a brake hydraulic control system according to an embodiment of the present invention.

FIG. 2 is a block diagram showing the configuration of the brake hydraulic control system according to the embodiment of the present invention. As shown in FIG. 2, the brake hydraulic control system according to the embodiment is equipped with an electronic control unit (ECU) 10, a wheel speed sensor 12, a hydraulic sensor 14, a DC motor 16, and a hydraulic actuator 18. In the present invention, the hydraulic sensor 14 is not required.

The hardware configuration of the ECU 10 is publicly known in this technical field, so it will not be described in detail in this specification. In the embodiment of the present invention, an ECU with an arbitrary configuration equipped with a CPU, a memory, an input/output device, and so forth can be used. In the embodiment of the present invention, a control program for performing the brake hydraulic control according to the present invention and a control program that performs base ABS control are installed in the ECU 10. The base ABS control can be performed by an arbitrary ABS control program, like those known in this technical field, for controlling the slip ratio of a wheel to ensure the steerability of the vehicle and shorten the braking distance. The brake hydraulic control according to the present invention is executed in parallel with the base ABS control. The base ABS control can be arbitrary, so it will not be described in this specification. Further, the ECU 10 is electrically connected to the later-described wheel speed sensor 12, hydraulic sensor 14, DC motor 16, and hydraulic actuator 18, supplies electrical power to the wheel speed sensor 12 and the hydraulic sensor 14, receives signals from these sensors, supplies electrical power to the DC motor 16, and controls the driving of the hydraulic actuator 18. Further, the ECU 10 is equipped with a timer function that will be described later together with FIG. 3.

The wheel speed sensor 12 is placed in the vicinity of a wheel of a vehicle and detects the rotational speed of the wheel as is known in this technical field. The configuration and placement of the wheel speed sensor 12 itself are publicly known in this technical field, so they will not be described in detail in this specification. In the embodiment of the present invention, an arbitrary wheel speed sensor can be used. For example, a wheel speed sensor that detects the rotational speed of the wheel of the vehicle electromagnetically or optically can be used. The wheel speed sensor 12 is connected to the ECU 10, and the ECU 10 supplies electrical power to the wheel speed sensor 12 and performs control of signal delivery and so forth with respect to the wheel speed sensor 12.

The hydraulic sensor 14 detects the pressure in the wheel cylinder of the vehicle. The configuration and placement of the hydraulic sensor 14 itself are publicly known in this technical field, so they will not be described in detail in this specification. In the embodiment of the present invention, a pressure sensor with an arbitrary configuration can be used. For example, a pressure sensor of the type that measures the deformation of a diaphragm with a strain gauge or a pressure sensor that utilizes a semiconductor can be utilized. The hydraulic sensor 14 is connected to the ECU 10, and the ECU 10 supplies electrical power to the hydraulic sensor 14 and performs control of signal delivery and so forth with respect to the pressure sensor 14. In the present invention, the hydraulic sensor 14 is not required.

The DC motor 16 drives the hydraulic pump 119 (see FIG. 1) as is known in this technical field. The configuration of the DC motor itself and the configuration of the hydraulic pump are publicly known in this technical field, so they will not be described in detail in this specification. In the embodiment of the present invention, a DC motor and a hydraulic pump with arbitrary configurations can be used.

Figure 1:
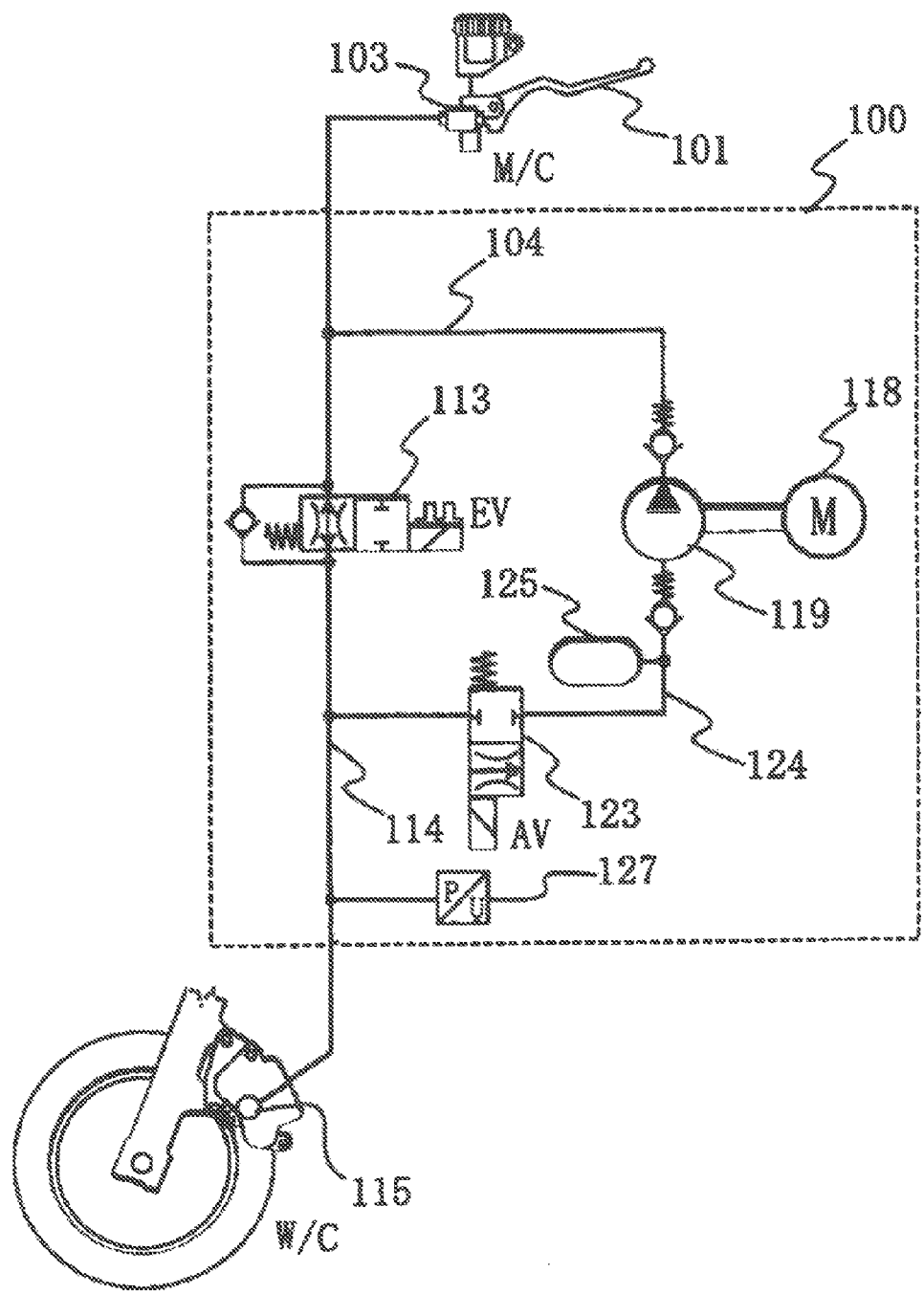
FIG. 1 is a diagram showing a hydraulic circuit of an exemplary brake hydraulic control system.

The hydraulic actuator 18 is placed in the hydraulic circuit of the vehicle (see the charging valve 113 and the pressure decreasing valve 123 of FIG. 1), is driven in accordance with a command from the ECU 10, and controls the movement of brake fluid in the hydraulic circuit. In the present embodiment, the hydraulic actuator 18 can be configured by the electromagnetic valves 113 and 123 that are driven electromagnetically. The hydraulic actuator 18 is connected to the ECU 10, and the ECU 10 controls the operation of the hydraulic actuator 18. It is not an essential requirement that the hydraulic actuator 18 in the present invention be able to be driven electromagnetically, and an actuator that controls the brake fluid by another format may also be used.

In the embodiment of the present invention, the hydraulic circuit can be configured by the same hydraulic circuit as in FIG. 1. However, in other embodiments, hydraulic circuits with other configurations can also be employed. Further, the hydraulic circuit shown in FIG. 1 is a hydraulic circuit just for the front wheel of a two-wheeled motor vehicle, but the hydraulic circuit for the rear wheel can be configured in the same way except that the brake lever in the hydraulic circuit for the front wheel is replaced with a footbrake pedal. Further, the present invention can be applied not only to the hydraulic brakes of a two-wheeled motor vehicle but also to the hydraulic brakes of a four wheeled vehicle such as a passenger car.

Figure 3:
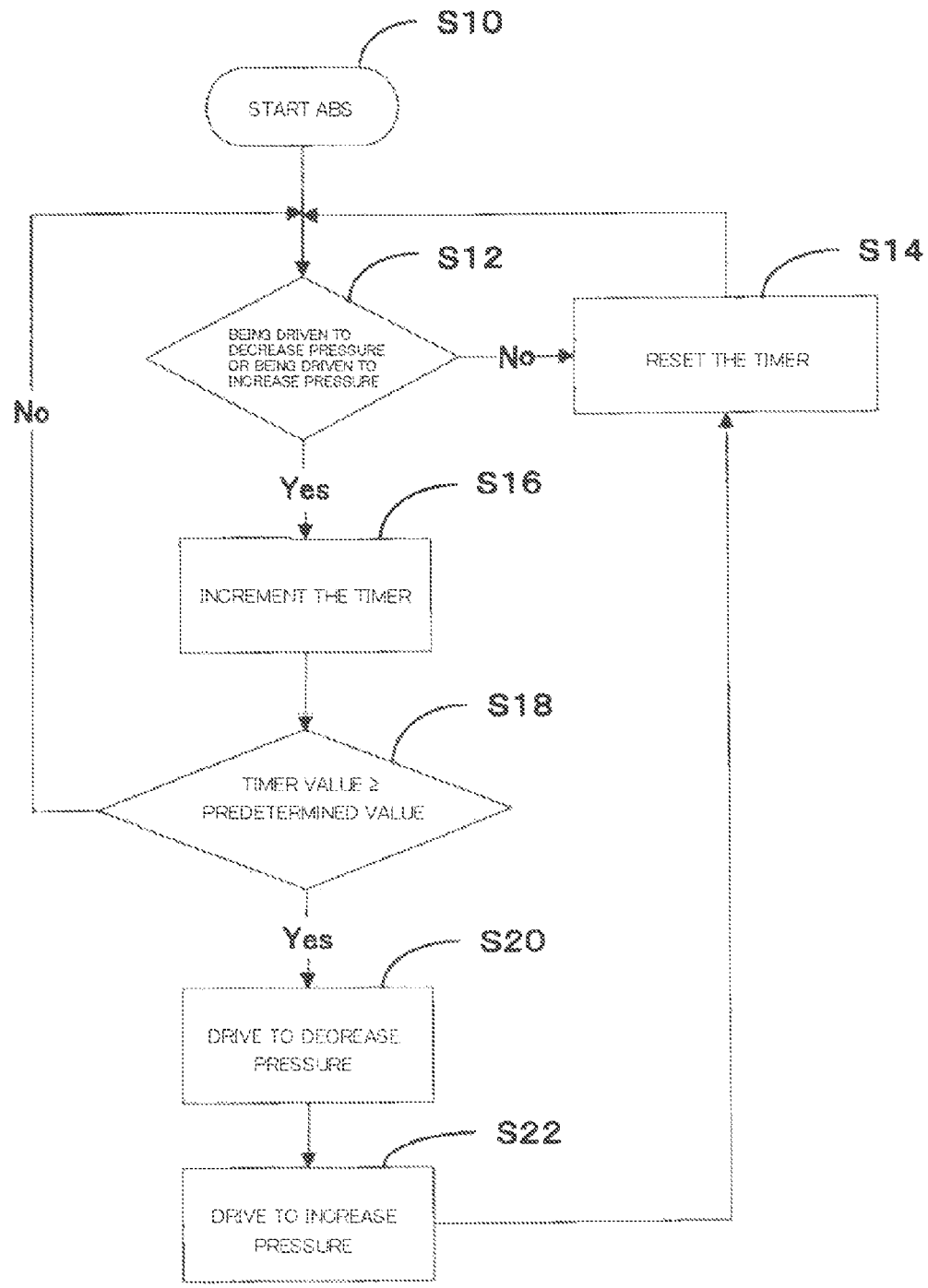
FIG. 3 is a diagram showing the operational flow of the brake hydraulic control system according to the embodiment of the present invention.

Next, the operation of the brake hydraulic control system according to the embodiment of the present invention will be described. FIG. 3 is a flowchart showing the operation of the brake hydraulic control system according to the embodiment of the present invention. The operational flow shown in FIG. 3 is controlled by the ECU 10.

First, the operation of the ABS is started in step S10. The condition in which the operation of the ABS starts can be an arbitrary condition. As is generally known, the operation of the ABS can be started when the ECU 10 calculates the slip ratio from the wheel speed detected by the wheel speed sensor 12 and the slip ratio has exceeded a predetermined value. When the ABS operates in step S10, the base ABS control is started. The base ABS control is not the topic of the present invention, so it will not be described in this specification, but it can be generally known control that automatically controls the hydraulic pressure in the wheel cylinder in such a way that the slip ratio becomes optimum. When the base ABS control is started, the brake hydraulic control according to the embodiment of the present invention is executed in parallel with the base ABS control as described below.

In step S12, the ECU 10 judges whether the hydraulic unit is being driven to decrease pressure or is being driven to hold pressure. The judgment of whether the hydraulic unit is being driven to decrease pressure or is being driven to hold pressure can be made on the basis of the drive signals from the ECU 10 to the charging valve 113 and the pressure decreasing valve 123. That is, the ECU 10 can judge a state in which the ECU 10 has transmitted a signal that closes the charging valve 113 to the charging valve 113 and has transmitted a signal that opens the pressure decreasing valve 123 to the pressure decreasing valve 123 as meaning that the hydraulic unit is being driven to decrease pressure and can judge a state in which the ECU 10 has transmitted signals that close both the charging valve 113 and the pressure decreasing valve 123 to both as meaning that the hydraulic unit is being driven to hold pressure. More simply, the ECU 10 may also, without distinguishing between whether the hydraulic unit is being driven to decrease pressure or is being driven to hold pressure, simply judge a state in which the ECU 10 has transmitted a signal that closes the charging valve 113 to the charging valve 113 as meaning that the hydraulic unit is being driven to decrease pressure or is being driven to hold pressure (that is, at least that the hydraulic unit is not being driven to increase pressure). As another embodiment, the ECU 10 may also use the hydraulic sensor 14 to judge whether the hydraulic unit is being driven to decrease pressure or is being driven to hold pressure. That is, the ECU 10 can judge whether the hydraulic unit is being driven to decrease pressure or is being driven to hold pressure by the time change in the hydraulic pressure value measured by the hydraulic sensor 14.

In step S14, the ECU 10 resets the timer in the ECU 10 in a case where the hydraulic unit is not being driven to decrease pressure or is not being driven to hold pressure.

In step S16, the ECU 10 increments the timer in the ECU 10 in a case where the hydraulic unit is being driven to decrease pressure or is being driven to hold pressure.

In step S18, the ECU 10 compares the timer value to a predetermined value. That is, the ECU 10 compares the elapsed time since the driving to decrease pressure or the driving to hold pressure is started to a predetermined time. In a case where the timer value is smaller than the predetermined value, the ECU 10 returns to step S12. That is, the elapsed time since the driving to decrease pressure or the driving to hold pressure is started is counted by step S12 to step S18. The predetermined time of the timer value can be configured in such a way that, for example, the drive frequency of forced driving to decrease pressure and driving to increase pressure described later becomes from about 2 Hz to about 4 Hz. That is, the predetermined value can be in a range of about 0.25 second (about 4 Hz) to about 0.5 second (about 2 Hz). In other embodiments, the predetermined value may be larger or smaller than this range. Further, the predetermined value can be a fixed value that is not changed during the driving of the vehicle. Of course, the predetermined value can also be a variable value that is changed during the driving of the vehicle. For example, the predetermined value can be configured in such a way that the drive frequency of the forced driving to decrease pressure and driving to increase pressure becomes larger together with the elapsed time since the first forced driving to decrease pressure and driving to increase pressure (or the drive frequency of the driving to decrease pressure and driving to increase pressure). Or, the predetermined value may be configured in such a way that it is changed in accordance with the road surface state, the traveling state of the vehicle, or the wheel state during the driving of the vehicle. For example, as an example of changing the predetermined value in accordance with the road surface state, the predetermined value may be configured in such a way that the drive frequency is increased in a case where the road surface is a low friction road surface and in such a way that the drive frequency is reduced in a case where the road surface is a high-friction road surface. Further, as an example of changing the predetermined value in accordance with the traveling state of the vehicle, the predetermined value may be configured in such a way that the drive frequency is increased in a case where the vehicle is traveling at a high speed and in such a way that the drive frequency is reduced in a case where the vehicle is traveling at a low speed. Further, as an example of changing the predetermined value in accordance with the wheel state, the predetermined value may be configured in such a way that the drive frequency is increased when the slip ratio of the wheel is large and in such a way that the drive frequency is reduced when the slip ratio of the wheel is small.

In a case where it has been judged in step S18 that the timer value is equal to or greater than the predetermined value, the ECU 10 drives the hydraulic unit to decrease pressure in step S20. Specifically, the ECU 10 drives the hydraulic unit in such a way as to open the pressure decreasing valve 123 for a predetermined time. The predetermined drive time of the pressure decreasing valve 123 can be a fixed value that is not changed during the driving of the vehicle. For example, the drive time of the pressure decreasing valve 123 can be 5 ms. The ECU 10 may also control the drive time of the pressure decreasing valve in such a way as to decrease pressure specifically about 1 bar in the shortest time that can be achieved by the performance of the hardware. The ECU 10 may also be configured to change the predetermined drive time of the pressure decreasing valve 123 in accordance with the road surface state or the traveling state of the vehicle during the driving of the vehicle. For example, the ECU 10 may be configured in such a way as to increase the drive time of the pressure decreasing valve 123 in a case where the road surface is a low-friction road surface and in such a way as to reduce the drive time of the pressure decreasing valve 123 in a case where the road surface is a high-friction road surface. Further, the ECU 10 may be configured in such a way as to increase the drive time of the pressure decreasing valve 123 in a case where the vehicle has a brake whose stiffness is low (whose fluid loss is large) and in such a way as to reduce the drive time of the pressure decreasing valve 123 in a case where the vehicle has a brake whose stiffness is high (whose fluid loss is small). Further, the ECU 10 may be configured in such a way as to reduce the drive time when the wheel hydraulic pressure is large and to increase the drive time when the wheel hydraulic pressure is small. Regardless of how the drive time of the pressure decreasing valve 123 is set, it is preferred that the drive time be set to a value that has substantially no impact on the operational performance of the base ABS. Specifically, it is desired that the drive time be set in such a way that a change in the braking force during the base ABS operation because of the driving of the pressure decreasing valve or the pressure increasing valve resulting from step S20 and step S22 falls in the range of about ±0.5%.

Next, the ECU 10 drives the hydraulic unit to increase pressure in step S22. Specifically, the ECU 10 closes the pressure decreasing valve 123 and opens the charging valve 113. For that reason, the brake fluid flows from the master cylinder 103 to the wheel cylinder 115, so the driver can obtain a braking feel. This driving to increase pressure is performed immediately after the driving to decrease pressure in step S20. Further, the amount of the driving to increase pressure matches the amount of the driving to decrease pressure in step S20. That is, pressure is increased by the amount that pressure is decreased in step S20. As another embodiment, the order of step S20 and step S22 may be reversed so that pressure is increased and thereafter pressure is decreased.

After the driving to decrease pressure and the driving to increase pressure in step S20 and step S22, the ECU 10 resets the timer in step S14.

In this way, the brake hydraulic control system according to the embodiment of the present invention decreases pressure and increases pressure to the wheel cylinder in a predetermined cycle prescribed by the predetermined value of the timer, so the driver can obtain a braking feel, and a sense of security can be given to the driver. Further, the amount of the pressure decrease and the amount of the pressure increase have substantially no impact on the base ABS operational performance (e.g., braking distance).

A specific condition to which the above brake hydraulic control system and brake hydraulic control method are applied will be described below with reference to FIG. 4.

Figure 4:
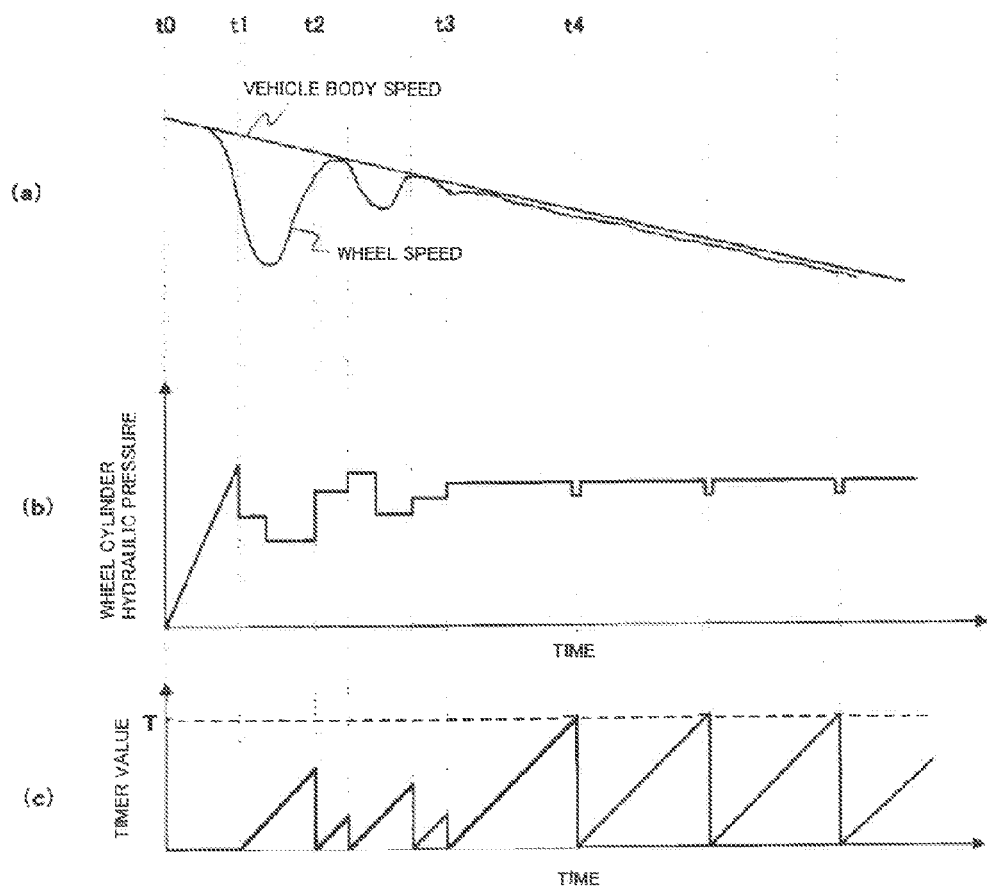
FIG. 4 is a diagram showing a condition at a time when the brake hydraulic control system according to the embodiment of the present invention is operating.

FIG. 4 shows a condition in which the brake of the vehicle is operated by the driver and the base ABS and the brake hydraulic control according to the present invention operate. In particular, FIG. 4 shows a condition in which the optimum slip ratio is achieved during the operation of the base ABS and a long holding mode continues. FIG. 4(a) shows changes over time in the vehicle body speed and wheel speed, FIG. 4(b) shows changes over time in the hydraulic pressure value in the wheel cylinder 115, and FIG. 4(c) shows changes over time in the timer value in the ECU 10.

When the handbrake lever 101 (see FIG. 1) or a footbrake pedal is operated by the driver, the vehicle body speed begins to decrease together with the wheel speed (t0). Then, the wheel begins to lock and the wheel speed drops sharply (t1). Here, the ABS operates and enters step S10 of the flowchart of FIG. 3. When the ABS operates, pressure to the wheel cylinder 115 is automatically decreased, and the locking of the wheel begins to be eliminated (t1 to t2). When the hydraulic unit is in the pressure decreasing mode or the holding mode, the elapsed time is counted by step S12 to step S18. However, at the stage of t1 to t3 in FIG. 4, the counter value of the timer does not reach the predetermined value T. Thereafter, the optimum slip ratio is achieved at time t3 because of the operation of the ABS. Consequently, from t3 on, a long holding mode continues. As shown in FIG. 4(c), when the timer value reaches the predetermined value T, pressure to the wheel cylinder 115 is forcibly decreased and increased by step S20 and step S22. In a state in which there is no forced decrease and increase of pressure to the wheel cylinder 115, the brake fluid in the master cylinder 103 is not transmitted to the wheel cylinder 115, so the driver has a sense of rejection in which the brake lever and the footbrake pedal have become stiff. However, in the present invention, forced pressure decrease and pressure increase are alternated between periodically, so the driver can obtain a braking feel, and this sense of rejection can be alleviated. Further, the quantity of the pressure decrease and the quantity of the pressure increase are slight, so they have substantially no impact on the operational performance of the base ABS, and an optimum braking distance can be achieved while ensuring steerability.

As described above, according to the brake hydraulic control system and the brake hydraulic control method of the present invention, even when a long pressure decreasing mode or holding mode continues in an ABS operation, a cyclic braking feel is obtained, and a sense of security can be given to the driver. Further, the system and the method are configured by simply adding the operational flow shown in FIG. 3 to the operation of the ABS without making any changes to the base ABS algorithm, so they are versatile. Further, the braking feel during ABS control can be improved also with respect to factors outside the ABS (such as engine drag).

In the above embodiment, an example of improving the braking feel during ABS control has been described, but the present invention can be applied not only to ABS control but also generally to times when the function of automatically regulating braking liquid pressure in a wheel cylinder of a vehicle without the intervention of an operation by the driver is executed. For example, the present invention can also be similarly applied to the aforementioned EBD control.

Further, the brake hydraulic control method according to the present invention does not have to operate all the time and may also be configured in such a way that the present invention's function of forcibly decreasing pressure and increasing pressure to the wheel cylinder is stopped in a case where a given condition is satisfied. The given condition is a case where the function of the base ABS or the function of the EBD is to be given overriding priority over the braking feel of the driver. For example, the brake hydraulic control method can be configured in such a way that the present invention's function of forcibly decreasing pressure and increasing pressure to the wheel cylinder is stopped when the vehicle jumps from a road surface whose friction coefficient μ is high to a road surface whose friction coefficient μ is low and wheel slip equal to or greater than a given amount is occurring, or when the vehicle is traveling at a low speed equal to or lower than a given speed, or when the vehicle is traveling at a high speed equal to or higher than a given speed, or when the vehicle is traveling around a curve, etc.

The invention claimed is:

1. A brake control method for a hydraulic brake system equipped with an actuator that automatically regulates brake hydraulic pressure in a wheel cylinder of a vehicle without the intervention of an operation by a driver, the brake control method comprising:
   (a) calculating a time period in which holding or decreasing brake hydraulic pressure is continuously performed in the wheel cylinder; and
   (b) controlling the actuator such that an increasing pressure and decreasing pressure to the wheel cylinder after the calculated time period has reached a predetermined time, the amount of the pressure increase and the amount of the pressure decrease are the same.

2. The brake control method according to claim 1, wherein the time period in step (a) is calculated on the basis of a drive signal to a charging valve (113) for supplying brake hydraulic pressure to the wheel cylinder.

3. The brake control method according to claim 1, wherein the predetermined time is determined based on at least one of a vehicle traveling state, a wheel state, and a road surface state.

4. The brake control method according to claim 1, wherein the brake control method resets the time period when the time period reaches the predetermined time, and restarts the calculation of the time period.

5. The brake control method according to claim 1, wherein the brake control method is executed in parallel with an ABS control.

6. A hydraulic brake system equipped with an actuator that automatically regulates brake hydraulic pressure in a wheel cylinder of a vehicle without the intervention of an operation by a driver, the hydraulic brake system comprising:
   (a) calculates a time period in which holding or decreasing brake hydraulic pressure is continuously performed in the wheel cylinder; and
   (b) means that control the driving of the actuator in such a way that, when increasing pressure and decreasing pressure to the wheel cylinder after the calculated time period has reached a predetermined time, the amount of the pressure increase and the amount of the pressure decrease are the same.

7. The brake system according to claim 6, wherein the time period in means (a) is calculated on the basis of a drive signal to a charging valve (113) for supplying brake hydraulic pressure to the wheel cylinder.

8. The brake system according to claim 6, wherein the predetermined time is determined based on at least one of a vehicle traveling state, a wheel state, and a road surface state.

9. The brake system according to claim 6, wherein each of the means can be executed in parallel with an ABS control.

10. The brake system according to claim 6, further including means which, resets the time period when the time period reaches the predetermined time, and restarts the calculation of the time period.

* * * * *